US009123976B2

(12) United States Patent
Jin et al.

(10) Patent No.: US 9,123,976 B2
(45) Date of Patent: Sep. 1, 2015

(54) CATALYST INCLUDING ACTIVE PARTICLES, METHOD OF PREPARING THE CATALYST, FUEL CELL INCLUDING THE CATALYST, ELECTRODE INCLUDING THE ACTIVE PARTICLES FOR LITHIUM AIR BATTERY, AND LITHIUM AIR BATTERY INCLUDING THE ELECTRODE

(75) Inventors: Seon-ah Jin, Pocheon-si (KR); Chan-ho Pak, Seoul (KR); Kang-hee Lee, Suwon-si (KR); Kyung-jung Kwon, Yongin-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 722 days.

(21) Appl. No.: 13/350,369

(22) Filed: Jan. 13, 2012

(65) Prior Publication Data
US 2012/0183869 A1 Jul. 19, 2012

(30) Foreign Application Priority Data

Jan. 13, 2011 (KR) ........................ 10-2011-0003551

(51) Int. Cl.
| | |
|---|---|
| H01M 4/02 | (2006.01) |
| H01M 4/36 | (2006.01) |
| H01M 4/90 | (2006.01) |
| H01M 4/92 | (2006.01) |
| H01M 4/94 | (2006.01) |

(Continued)

(52) U.S. Cl.
CPC ............ *H01M 12/08* (2013.01); *H01M 4/8657* (2013.01); *H01M 4/9016* (2013.01); *H01M 4/92* (2013.01); *H01M 4/921* (2013.01); *B01J 21/063* (2013.01); *B01J 23/40* (2013.01); *B01J 35/008* (2013.01); *B01J 35/0033* (2013.01); *B01J 37/16* (2013.01); *B01J 37/348* (2013.01); *H01M 2008/1095* (2013.01); *Y02E 60/50* (2013.01)

(58) Field of Classification Search
CPC .... H01M 4/90; H01M 4/9016; H01M 4/9083
USPC ........................ 429/523, 524, 525, 528, 530; 252/182.1; 502/300
IPC .................... H01M 4/86, 4/9041, 4/9083, 4/92, H01M 4/926, 4/48
See application file for complete search history.

(56) References Cited

U.S. PATENT DOCUMENTS

| | | | |
|---|---|---|---|
| 8,236,452 B2 * | 8/2012 | Zhamu et al. ............ | 429/231.95 |
| 2006/0134505 A1 | 6/2006 | Wang et al. | |

(Continued)

FOREIGN PATENT DOCUMENTS

| | | |
|---|---|---|
| EP | 1653535 A1 | 5/2006 |
| JP | 2005-135900 | 5/2005 |

(Continued)

OTHER PUBLICATIONS

English abstract of KR 10-2006-0082595 (Jul. 2006).

(Continued)

*Primary Examiner* — Patrick Ryan
*Assistant Examiner* — Julian Anthony
(74) *Attorney, Agent, or Firm* — Cantor Colburn LLP

(57) ABSTRACT

A catalyst including active particles that have a core including a first metal oxide, and a shell including an alloy of a second metal with a reduction product of the first metal oxide; a method of preparing the catalyst; a fuel cell including the catalyst; an electrode for lithium air battery that includes the active particles; and a lithium air battery including the electrode.

22 Claims, 20 Drawing Sheets

(51) Int. Cl.
B01J 23/00 (2006.01)
H01M 12/08 (2006.01)
H01M 4/86 (2006.01)
H01M 8/10 (2006.01)
B01J 21/06 (2006.01)
B01J 23/40 (2006.01)
B01J 37/16 (2006.01)
B01J 37/34 (2006.01)
B01J 35/00 (2006.01)

(56) References Cited

U.S. PATENT DOCUMENTS

| | | | |
|---|---|---|---|
| 2007/0031722 A1 | 2/2007 | Adzic et al. | |
| 2008/0038615 A1* | 2/2008 | Son | 429/30 |
| 2008/0280190 A1* | 11/2008 | Dopp et al. | 429/44 |
| 2010/0092841 A1 | 4/2010 | Lopez et al. | |
| 2010/0216632 A1 | 8/2010 | Adzic et al. | |

FOREIGN PATENT DOCUMENTS

| | | |
|---|---|---|
| JP | 2008-153192 | 7/2008 |
| KR | 10-07636538 | 6/2007 |
| KR | 10-2010-0009359 | 1/2010 |
| WO | 2006124959 A2 | 11/2006 |
| WO | 2006124959 A3 | 11/2006 |

OTHER PUBLICATIONS

Extended European Search Report for Application No. 12150833.7—1359/2477264 dated Mar. 31, 2014.

* cited by examiner

CATALYST INCLUDING ACTIVE PARTICLES, METHOD OF PREPARING THE CATALYST, FUEL CELL INCLUDING THE CATALYST, ELECTRODE INCLUDING THE ACTIVE PARTICLES FOR LITHIUM AIR BATTERY, AND LITHIUM AIR BATTERY INCLUDING THE ELECTRODE

CROSS-REFERENCE TO RELATED APPLICATIONS

This application claims the benefit of Korean Patent Application No. 10-2011-0003551, filed on Jan. 13, 2011, in the Korean Intellectual Property Office, the disclosure of which is incorporated herein by reference.

BACKGROUND OF THE INVENTION

1. Field of the Invention

The present disclosure relates to a catalyst including active particles, a method of preparing the catalyst, a fuel cell including the catalyst, an electrode including the active particles for lithium air battery, and a lithium air battery including the electrode.

2. Description of the Related Art

Fuel cells are power generating cells that, for example, directly convert energy from a chemical reaction of hydrogen and oxygen into electric energy. Fuel cells may continue to generate electricity unless an external supply of hydrogen and oxygen is interrupted, unlike general batteries, and the ability to directly generate electricity, which is distinct from existing power generating modes suffering from efficiency loss over multiple steps, may lead to efficiencies twice as high as those of internal combustion engines.

According to the types of electrolyte and fuel used, fuel cells can be classified as polymer electrolyte membrane fuel cells (PEMFCs), direct methanol fuel cells (DMFCs), phosphoric acid fuel cells (PAFCs), molten carbonate fuel cells (MCFCs), or solid oxide fuel cells (SOFCs).

PEMFCs and DMFCs, which are power generating systems generating direct current (DC) electricity from electrochemical reactions between hydrogen or methanol and oxygen, may each include a membrane-electrode assembly (MEA) with an anode to which reaction liquid or gas is supplied, a cathode, and a proton conducting membrane disposed between the anode and the cathode.

In the anode, protons are generated through oxidation of hydrogen or methanol, employing a catalyst. These protons pass through the proton conducting membrane and reach the cathode where the protons react with oxygen in the presence of a catalyst, thereby generating electricity. Thus, in fuel cells having such a structure as described above the role of the catalysts is crucial.

A PEMFC employs an amorphous carbon support with dispersed Pt particles both in the anode and the cathode. A DMFC uses Pt—Ru in the anode, and Pt in the cathode, which are used either in particulate form or dispersed in an amorphous carbon support.

Catalysts are a key contributing factor to the entire manufacturing cost of fuel cells, and may have a crucial effect on the mass production and commercialization of fuel cells. Therefore, there has been an increasing demand for the development of catalysts that exhibit high activity even with the use of a small amount thereof.

SUMMARY OF THE INVENTION

Provided are catalysts including active particles with improved activity, methods of preparing the catalysts, fuel cells including the catalysts, electrodes including the active particles for lithium air batteries, and lithium air batteries including the electrodes.

Additional aspects will be set forth in part in the description which follows and, in part, will be apparent from the description, or may be learned by practice of the presented embodiments by those skilled in the art.

According to an aspect of the present invention, there are provided catalysts which include active particles, each having a core that includes a first metal ($M_1$) oxide; and a shell that includes an alloy of a second metal ($M_2$) with a reduction product of the first metal oxide.

According to another aspect of the present invention, a method of preparing the catalysts described above is provided, which includes mixing a first metal ($M_1$) oxide and a second metal ($M_2$) precursor or second metal ($M_2$) particles together to obtain a mixture, and performing thermal treatment to induce reduction of the mixture at about 400° C. or higher.

The first metal oxide may be prepared by mixing a first metal precursor and a solvent together to obtain a mixture; drying the mixture, and performing thermal treatment to induce oxidation of the mixture.

The method may further include adding a carbonaceous support when mixing the first metal precursor and the solvent together.

According to another aspect of the present invention, fuel cells are provided, which include a cathode, an anode, and an electrolyte membrane disposed between the cathode and the anode, wherein at least one of the cathode and anode includes the above-described catalyst.

According to another aspect of the present invention, electrodes for lithium air batteries are provided, which include active particles, each with a core that includes a first metal oxide, and a shell that includes an alloy of a second metal with a reduction product of the first metal oxide.

According to another aspect of the present invention, there are provided lithium air batteries, which include the above-described electrodes.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
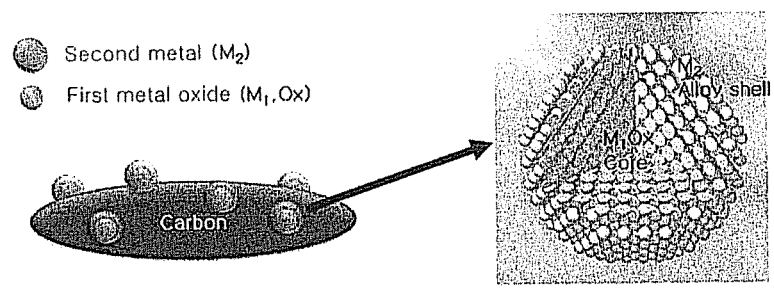
FIG. 1 is a schematic diagram of a catalyst according to an embodiment of the present disclosure.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

According to an embodiment of the present disclosure, there is provided a catalyst including core-shell structured active particles that each have a core including a first metal oxide, and a shell including an alloy of a second metal with a reduction product of the first metal oxide.

The first metal ($M_1$) may be at least one selected from among metals of Groups 3-8, Groups 10-14, and Group 16 of the periodic table of elements.

The metal ($M_1$) may include at least one selected from the group consisting of titanium (Ti), zirconium (Zr), vanadium (V), niobium (Nb), tantalum (Ta), molybdenum (Mo), tungsten (W), manganese (Mn), tin (Sn), indium (In), cerium (Ce), lanthanum (La), chromium (Cr), zinc (Zn), iron (Fe), cobalt (Co), nickel (Ni), copper (Cu), tellurium (Te), and yttrium (Y).

The second metal ($M_2$) may be at least one selected from among metals of Groups 8-11 of the periodic table of elements.

The second metal may include at least one selected from the group consisting of Pt, Pd, Ru, Ir, Au, and Ag.

The second metal alloy may be, for example, a Pt alloy, a Pd alloy, or a Pd—Ir alloy.

The Pd—Ir alloy may be, for example, a $Pd_5Ir$ alloy.

The reduction product is a product obtained by reducing the first metal oxide ($M_1Ox$) (wherein $M_1$ is at least one selected from among Ti, Zr, V, Nb, Ta, Mo, W, Mn, Sn, In, Ce, La, Cr, Zn, Fe, Co, Ni, Cu, Te, and Y; and $1 \leq x \leq 3$) and it may be represented by ($M_1Ox\text{-}y$) (wherein $M_1$ is at least one selected from among Ti, Zr, V, Nb, Ta, Mo, W, Mn, Sn, In, Ce, La, Cr, Zn, Fe, Co, Ni, Cu, Te, and Y; $1 \leq x \leq 3$; $0 \leq x\text{-}y$; and $0 < y \leq 3$, for example, $0.5 \leq y \leq 3$). In this regard, y may have the same or smaller range of numerals as compared with x.

The reduction product ($M_1Ox\text{-}y$) of the first metal oxide with x=3.0 and y<3.0 may be a partial reduction product of the first metal oxide.

A reduction product ($M_1Ox\text{-}y$) of the first metal oxide with, for example, x=3.0 and y=3.0 may be, may be the first metal ($M_1$), which is a full reduction product of the first metal oxide.

For example, if the first metal oxide is a cerium oxide ($CeO_2$), a reduction product thereof may be a cerium oxide ($CeO_{2\text{-}y}$, $0<y<2$), which is a partial reduction product of the first metal oxide, or may be cerium oxide ($CeO_{2\text{-}y}$, y=2), that is, cerium (Ce), which is a full reduction product of the first metal oxide.

The catalyst may further include a carbonaceous support, in addition to the active particles with a core-shell structure. The carbonaceous support is reacted with the first metal oxide to prepare a first metal oxide-carbon composite material.

In an embodiment, when the first metal oxide is supported by the carbonaceous support, and the second metal is added thereto, via high-temperature surface reduction reaction of the first metal oxide in the presence of the second metal, strong bonds are formed between a reduction product of the first metal oxide and the second metal, thereby enhancing the activity of the catalyst.

The amount of second metal in the catalyst may be from about 1 part to 70 parts by weight based on 100 parts by weight of the total weight of the first metal oxide and a reduction product of the first metal oxide.

FIG. 1 illustrates a catalyst supported on a carbonaceous support, according to an embodiment of the present disclosure.

Referring to FIG. 1, the catalyst includes the active particles with the core-shell structure supported on the carbonaceous support.

The core of the catalyst includes a first metal oxide ($M_1O_x$) (wherein $M_1$ is at least one selected from among Ti, Zr, V, Nb, Ta, Mo, W, Mn, Sn, In, Ce, La, Cr, Zn, Fe, Co, Ni, Cu, Te, and Y; and $1 \leq x \leq 3$).

The core of the catalyst may be covered with a shell that includes an alloy of a second metal ($M_2$) (wherein $M_2$ is at least one selected from among Pt, Pd, Ru, Ir, Au, and Ag) with a reduction product of the first metal oxide ($M_1O_{x-y}$) (wherein $M_1$ is at least one selected from among Ti, Zr, V, Nb, Ta, Mo, W, Mn, Sn, In, Ce, La, Cr, Zn, Fe, Co, Ni, Cu, Te, and Y; and $1 \leq x \leq 3$, $0 \leq x-y$, and $0 < y \leq 3$) on a surface of the core. Although not illustrated in FIG. 1, the catalyst may further include a second layer that contains a second metal on an outer surface of the shell.

The core-shell structure of the catalyst may be identified using scanning transmission electron microscopy with energy-dispersive X-ray spectrometry (STEM-EDX).

The second metal layer may have any suitable thickness, for example, it may have a thickness of from about 0.1 nm to about 5 nm.

Figure 2:
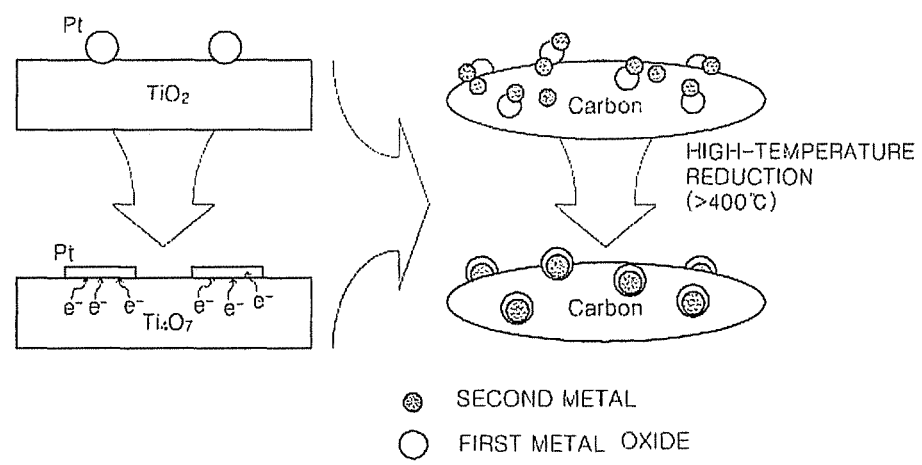
FIG. 2 is a diagram schematically illustrating preparation processes of a catalyst according to an embodiment of the present disclosure.

FIG. 2 is a diagram for describing preparation processes of a catalyst, according to an embodiment of the present disclosure, which uses titanium oxide ($TiO_2$) as the first metal oxide, platinum (Pt) as the second metal, and carbon as a carbonaceous support.

As illustrated in FIG. 2, when a $TiO_2$/Pt catalyst is subjected to high-temperature reduction at about 400° C. or higher, strong chemical bonds are formed between $TiO_2$ and Pt in the catalyst so that Pt spreads over a surface of $TiO_2$. At the same time, a partially reduced titanium oxide $Ti_4O_7$ donates electrons to Pt, so that the oxygen reduction reaction (ORR) activity of Pt is enhanced.

According to an embodiment of the present disclosure, a catalyst with a core-shell structure may be obtained by preparing a first metal oxide-carbon composite for forming the core, supporting particles of a second metal or a second metal precursor on the first metal oxide-carbon composite material, and performing a high-temperature reducing process to induce strong metal-support interactions.

"Strong metal-support interactions" means very strong interactions exerted between the second metal and first metal oxide, which are attributed to chemical bonds between the second metal and the first metal oxide formed as a result of reducing the first metal oxide support with the second metal supported thereon.

The strong bond between a reduction product of the first metal oxide and the second metal will improve the activity of the catalyst. Using an electrode including this catalyst, a battery with improved durability and cell performance can be manufactured.

In an embodiment, the catalyst may include titanium (Ti) as the first metal, and platinum (Pt) as the second metal.

In some embodiments the active particles of the catalyst may include Ti or Ce as the first metal, and an alloy of Pd and Ir such as $Pd_5Ir$ as the second metal.

In other embodiments, the active particles of the catalyst may include Ti, Ce, Ta, Mo, Sn, W, In, or Mn as the first metal, and Pd as the second metal.

Non-limiting examples of the active particles of the catalyst are active particles with a core including titanium oxide ($TiO_2$) and a shell including an alloy of $Pd_5Ir$ with a reduction product ($TiO_{2-y}$, $0 < y \leq 2$) of the titanium oxide; active particles with a core including cerium oxide ($CeO_2$) and a shell including an alloy of $Pd_5Ir$ with a reduction product ($CeO_{2-y}$, $0 < y \leq 2$) of the cerium oxide; active particles with a core including tantalum oxide ($TaO_{2.5}$) and a shell including an alloy of Pd with a reduction product ($TaO_{2.5-y}$, $0 < y \leq 2.5$) of the tantalum oxide; active particles with a core including molybdenum oxide ($MoO_3$) and a shell including an alloy of Pd with a reduction product ($MoO_{3-y}$, $0 < y \leq 3$) of the molybdenum oxide; active particles with a core including tin oxide ($SnO_2$) and a shell including an alloy of Pd with a reduction product ($SnO_{2-y}$, $0 < y \leq 2$) of the tin oxide; active particles with a core including cerium oxide ($CeO_2$) and a shell including an alloy of Pd with a reduction product ($CeO_{2-y}$, $0 < y \leq 2$) of the cerium oxide; active particles with a core including titanium oxide ($TiO_2$) and a shell including an alloy of Pd with a reduction product ($TiO_{2-y}$, $0 < y \leq 2$) of the titanium oxide; active particles with a core including tungsten oxide ($WO_2$) and a shell including an alloy of Pd with a reduction product ($WO_{2-y}$, $0 < y \leq 2$) of the tungsten oxide; active particles with a core including indium oxide ($InO_{1.5}$) and a shell including an alloy of Pd with a reduction product ($InO_{1.5-y}$, $0 < y \leq 1.5$) of the indium oxide; active particles with a core including titanium oxide ($TiO_2$) and a shell including an alloy of Pt with a reduction product ($TiO_{2-y}$, $0 < y \leq 2$) of the titanium oxide; and active particles with a core including manganese oxide ($MnO_2$), and a shell including an alloy of Pd with a reduction product of the manganese oxide ($MnO_{2-y}$, $0 < y \leq 2$).

The amount of the second metal (for example, $Pd_5Ir$) in the catalyst may be from about 1 part to 70 parts by weight based on 100 parts by weight of the total weight of the first metal oxide (for example, $TiO_2$) and the reduction product of the first metal oxide (for example, $TiO_{2-y}$, $0 < y \leq 2$). In some embodiments catalysts that are not specifically indicated above may have the same composition as above. The catalyst may further include a carbonaceous support. When the catalyst further includes a carbonaceous support, the carbonaceous support may react with the first metal oxide, such as titanium oxide, cerium oxide, or the like, thereby forming a composite material. As a result, the catalyst may have a core that includes the first metal oxide (titanium oxide)-carbonaceous support composite material, and a shell that includes an alloy of the second metal with a reduction product of the composite material.

The carbonaceous support may be selected from the group consisting of, for example, ketjen black, carbon black, graphite carbon, carbon nanotubes, Vulcan carbon, and carbon fiber.

The amount of the carbonaceous support may be from about 10 parts to about 99.9 parts by weight, for example, from about 30 parts to about 80 parts by weight, based on 100 parts by weight of a total weight of the catalyst. When the amount of the carbonaceous support is within these ranges, the catalyst will have improved activity. The total weight of the catalyst means the total weight of the active particles and carbonaceous support.

The catalyst may be used in an electrode for fuel cells.

According to another embodiment of the present disclosure, there is provided a fuel cell including a polymer electrolyte membrane, and an anode and a cathode, at least one of the cathode and anode having a catalyst layer that contains the above-described catalyst on opposite sides of the polymer electrolyte membrane.

The hydrogen oxidation reaction (HOR) represented below occurs in the anode.

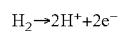

Hydrogen ions (H+) generated by the reaction diffuse.

On the other hand, the oxygen reduction reaction (ORR) represented below takes place in the cathode.

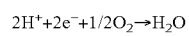

In the catalyst for electrodes of fuel cells the active particles supported on the carbonaceous support may have a diameter of from about 1 nm to about 20 nm. When the diameter of the active materials is within these ranges, the catalyst will have increased activity. The diameter of the catalyst active particles may be identified using X-ray diffraction (XRD) analysis.

In these embodiments the catalyst will have high ORR activity.

Hereinafter, a method of preparing the above-described catalyst, according to an embodiment of the present disclosure, will now be described in detail.

First, a first metal oxide is mixed with a second metal precursor or second metal particles to obtain a mixture. The mixture is thermally treated at about 400 or higher, to be reduced, thereby preparing the catalyst. These processes will now be described in more detail below.

Preparation of the first metal oxide particles involves mixing a first metal precursor and a solvent to obtain a mixture, drying and thermally treating the mixture to oxidize it. In mixing the first metal precursor and the solvent together, a carbonaceous support may be further added. When the carbonaceous support is further added, as a result of the thermal treatment to induce oxidation, an amorphous or low-crystalline first metal oxide-carbonaceous support composite material will be obtained.

The solvent may be water, ethanol, methanol, ethylene glycol, or the like.

The amount of the solvent may be from about 100 parts to about 5000 parts by weight based on 100 parts by weight of the first metal precursor. When the amount of the solvent is within this range, all the components for forming the catalyst will be uniformly and thoroughly dispersed and mixed in the composition.

Non-limiting examples of the first metal precursor are a nitrate, chloride, sulfate, acetate, acetylacetonate, cyanide, isopropoxide, and butoxide of the first metal.

The amount of the carbonaceous support may be from about 1 part to about 1,000 parts by weight based on 100 parts by weight of the first metal precursor. When the amount of the carbonaceous support is within this range, the catalyst will have increased activity.

The mixture of the first metal precursor and the solvent is dried and thermally treated to oxidize it.

The thermal treatment to induce oxidation may be performed at a temperature of lower then about 300° C., and in some embodiments, may be performed at a temperature from about 100° C. to about 299° C. When the thermal treatment to induce oxidation is performed within these temperature ranges, amorphous or low-crystalline first metal oxide or first metal oxide-carbonaceous support composite material particles will be obtained. Using the first metal oxide or first metal oxide-carbonaceous support composite material, the catalyst will have enhanced activity.

The mixing of the first metal oxide with the second metal precursor or second metal particles together may be performed, for example, in the presence of a reducing agent to disperse the second metal precursor or second metal particles in the first metal oxide. In some embodiments, the second metal particles may be dispersed in the resulting product obtained by the thermal treatment to induce oxidation using liquid-phase reduction, or the second metal precursor may be dispersed in the resulting product obtained by the thermal treatment to induce oxidation.

The second metal precursor may be at least one selected from among a palladium precursor, a platinum precursor, a ruthenium precursor, an iridium precursor, a silver precursor, and a gold precursor.

Non-limiting examples of the palladium precursor, platinum precursor, ruthenium precursor, iridium precursor, silver precursor, and gold precursor are nitrates, chlorides, sulfides, acetates, acetylacetonates, cyanides, isopropoxides, and butoxides of palladium, platinum, ruthenium, iridium, silver, and gold, respectively.

The amount of the second metal precursor may be from about 50 parts to about 1000 parts by weight based on 100 parts by weight of the first metal precursor. When the amount of the second metal precursor is in this range, the catalyst will exhibit improved activity.

The liquid-phase reduction may use a reducing agent, for example, $NaBH_4$, hydrazine, citric acid, hydrogen, or ascorbic acid.

The amount of the reducing agent may be from about 1 mole to about 5 moles based on 1 mole of the second metal precursor or second metal particles. When the amount of the reducing agent is within this range, reactivity of the reduction reaction will be high.

The resulting dispersion may be thermally treated at about 400° C. or higher to be reduced.

The thermal treatment to induce reduction may be performed at a temperature of from about 400° C. to about 900° C., and in some embodiments, may be performed at a temperature from about 400° C. to about 800° C., and in some other embodiments, may be performed at a temperature from about 400° C. to about 700° C. When the thermal treatment temperature for reduction is within these ranges, a catalyst with increased activity will be attained.

The thermal treatment to induce reduction is not specifically limited; for example, the thermal treatment to induce reduction may be performed in a furnace supplied with a reducing gas. The reducing gas may be, for example, hydrogen.

According to an embodiment of the present disclosure, there is provided a fuel cell including a cathode, an anode, and an electrolyte membrane disposed between the cathode and the anode, wherein at least one of the cathode and the anode contains the above-described catalyst.

The catalyst may be a catalyst supported on a carbonaceous support, or may be a non-supported catalyst.

The catalyst may be, for example, a supported catalyst, which may be used in the cathode.

The fuel cell may be implemented as, for example, a phosphoric acid fuel cell (PAFC), a polymer electrolyte membrane fuel cell (PEMFC), or a direct methanol fuel cell (DMFC).

In an embodiment the fuel cell may be a PEMFC for vehicles.

Figure 3:
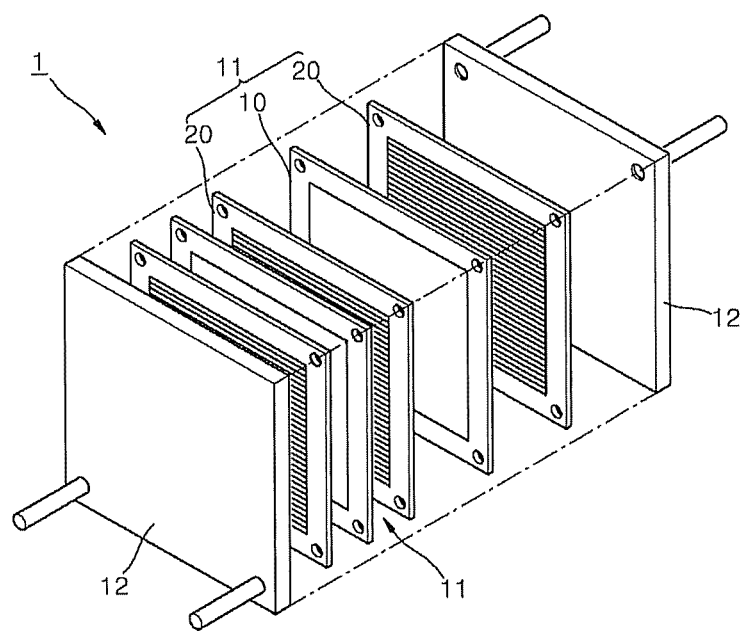
FIG. 3 is a perspective exploded view of a fuel cell according to an embodiment of the present disclosure.
Figure 4:
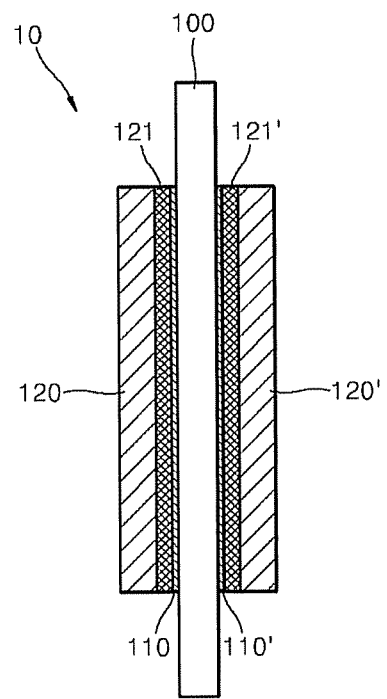
FIG. 4 is a cross-sectional diagram of a membrane-electrode assembly (MEA) forming the fuel cell of FIG. 3.

FIG. 3 is a perspective exploded view of a fuel cell 1 according to an embodiment of the present disclosure. FIG. 4 is a cross-sectional diagram of a membrane-electrode assembly (MEA) of the fuel cell 1 of FIG. 3.

Referring to FIG. 3, the fuel cell 1 includes two unit cells 11 that are supported by a pair of holders 12. Each unit cell 11 includes an MEA 10, and bipolar plates 20 and 20 disposed on lateral sides of the MEA 10. The bipolar plates 20 include a conductive metal, carbon or the like, and function as current collectors while providing oxygen and fuel to the catalyst layers of the MEAs 10.

Although only two unit cells 11 are shown in FIG. 3, the number of unit cells is not limited to two and a fuel cell may have several tens or hundreds of unit cells, depending on the required properties of the fuel cell.

Referring to FIG. 4, each MEA 10 includes an electrolyte membrane 100, catalyst layers 110 and 110' including an electrode catalyst according to one of the above-described embodiments and respectively disposed on either side of the electrolyte membrane 100 in the thickness direction thereof; first gas diffusion layers 121 and 121' respectively stacked on the catalyst layers 110 and 110'; and second gas diffusion layers 120 and 120' respectively stacked on the first gas diffusion layers 121 and 121'.

The catalyst layers 110 and 110' include a catalyst according to one of the above-described embodiments, and a binder therein. The catalyst layers 110 and 110' may further include a material able to increase the electrochemical surface area of the catalyst.

The first gas diffusion layers 121 and 121' and the second gas diffusion layers 120 and 120' may each be formed of a material such as, for example, carbon sheet or carbon paper. The first gas diffusion layers 121 and 121' and the second gas diffusion layers 120 and 120' diffuse oxygen and fuel supplied through the bipolar plates 20 into the entire surfaces of the catalyst layers 110 and 110'.

The fuel cell 1 including the MEA 10 operates at a temperature of 100 to 300° C. Fuel such as hydrogen is supplied through one of the bipolar plates 20 into a first catalyst layer, and an oxidant such as oxygen is supplied through the other bipolar plate 20 into a second catalyst layer. Then, hydrogen is oxidized into protons in the first catalyst layer, and the protons are conducted to the second catalyst layer through the electrolyte membrane 4. Then, the protons electrochemically react with oxygen in the second catalyst layer to produce water and generate electrical energy. Hydrogen produced by reforming hydrocarbons or alcohols may be used as the fuel. Oxygen as the oxidant may be supplied in the form of air.

According to embodiments of the present disclosure, there are provided electrodes for a lithium air battery that includes core-shell structured active particles having a core that includes a first metal oxide, and a shell that includes an alloy of a second metal with a reduction product of the first metal oxide; and lithium air batteries including the electrode.

The electrode may include a carbonaceous material. The carbonaceous material may be selected from the group consisting of, for example, ketjen black, carbon black, graphite carbon, carbon nanotubes, Vulcan carbon, and carbon fiber.

The active particles may be used as an electrode active material. The electrode active material may be, for example, a cathode active material.

Types and amounts of the first metal and second metal in the active particles may be identical to those used in the catalyst described above.

Hereinafter, one or more embodiments of the present invention will be described in detail with reference to the following examples. These examples are not intended to limit the purpose and scope of the one or more embodiments of the present invention.

EXAMPLE 1

Preparation of Catalyst

Titanium tetraisopropoxide (0.78 g) (Ti(OCH(CH$_3$)$_2$)$_4$) as a titanium precursor and 1 g of Ketjen Black (KB) as a carbonaceous material were dispersed in 100 g of ethanol and mixed together to prepare a mixed solution. The mixed solution was dried by distillation at about 60° C. under a reduced pressure, and heated at about 200° C. in the air to prepare an amorphous titanium oxide-carbon composite material.

Afterward, 0.914 g of palladium nitrate (Pd(NO$_3$)$_2$.2H$_2$O) as a Pd precursor and 0.340 g of hexachloroiridic acid hexahydrate as an Ir precursor were dissolved in distilled water to prepare a mixed solution. 0.5 g of the titanium oxide-carbon composite material was added to 300 g of this mixed solution, followed by titration with a 10 wt % NaOH solution to pH 11, and agitation.

NaBH$_4$ (1 g) dissolved in 100 g of distilled water was added to the titrated mixed solution that was agitated so that the Pd$_5$Ir particles were dispersed on the titanium oxide-carbon composite material. The resulting mixture was thermally treated at about 500° C. in a hydrogen atmosphere to obtain a catalyst including active materials supported on the carbonaceous support, wherein the active materials had a core of titanium oxide (TiO$_2$) and a shell of an alloy of Pd$_5$Ir with a reduction product (TiO$_{2-y}$, 0<y≤2) of the titanium oxide. The amount of the carbonaceous support was about 40 parts by weight based on 100 parts by weight of the total weight of the catalyst.

EXAMPLE 2

Preparation of Catalyst

CeCl$_3$.7H$_2$O (0.99 g) as a Ce precursor and 1 g of KB as a carbonaceous material were dispersed in 100 g of distilled water and mixed together to prepare a mixed solution.

The mixed solution was dried by distillation at about 60° C. under a reduced pressure, and heated at about 200° C. in the air to prepare a cerium oxide-carbon composite material in the form of nanoparticulates.

Afterward, the same catalyst preparation processes as used in Example 1, in which Pd and Ir were supported on the titanium oxide-carbon composite material, were performed except that the cerium oxide-carbon composite material instead of the titanium oxide-carbon composite material was used, thereby preparing a catalyst including active particles supported on the carbonaceous support, wherein the active particles had a core of cerium oxide (CeO$_2$) and a shell of an alloy of Pd$_5$Ir with a reduction product (CeO$_{2-y}$, 0<y≤2) of the cerium oxide. The amount of the carbonaceous support was about 40 parts by weight based on 100 parts by weight of a total weight of the catalyst.

EXAMPLE 3

Preparation of Catalyst

Tantalum chloride as a Ta precursor (0.952 g) and 1 g of KB as a carbonaceous material were dispersed in 100 g of distilled water to prepare a mixed solution.

The mixed solution was dried by distillation at about 60° C. under a reduced pressure, and heated at about 200° C. in the air to prepare a tantalum oxide-carbon composite material in the form of nanoparticulates.

Afterward, 1.24 g of palladium nitrate (Pd(NO$_3$)$_2$.2H$_2$O) as a Pd precursor was dissolved in distilled water to prepare a mixed solution. The tantalum oxide-carbon composite material (0.5 g) was added to 60 g of this mixed solution and agitated.

The mixed solution was dried by distillation at about 60° C. under a reduced pressure. Subsequently, the dried product was thermally treated at about 500° C. in a hydrogen atmosphere, thereby preparing a catalyst including active particles supported on the carbonaceous support, wherein the active particles had a core of tantalum oxide (TaO$_{2.5}$) and a shell of an alloy of Pd with a reduction product (TaO$_{2.5-y}$, 0<y≤2.5) of the tantalum oxide. The amount of the carbonaceous support was about 40 parts by weight based on 100 parts by weight of a total weight of the catalyst.

EXAMPLE 4

Preparation of Catalyst

Ammonium molybdate tetrahydrate (0.47 g) as a Mo precursor and 1 g of KB as a carbonaceous material were dispersed in 100 g of distilled water to prepare a mixed solution.

The mixed solution was dried by distillation at about 60° C. under a reduced pressure, and heated at about 200° C. in the air to prepare a molybdenum oxide-carbon composite material in the form of nanoparticulates.

Afterward, 1.24 g of palladium nitrate $(Pd(NO_3)_2 \cdot 2H_2O)$ as a Pd precursor was dissolved in distilled water to prepare a mixed solution. The molybdenum oxide-carbon composite material (0.5 g) was added to 60 g of this mixed solution and agitated. The mixed solution was dried by distillation at about 60° C. under a reduced pressure. Subsequently, the dried product was thermally treated at about 500° C. in a hydrogen atmosphere, thereby preparing a catalyst including active particles supported on the carbonaceous support, wherein the active particles had a core of molybdenum oxide $(MoO_3)$ and a shell of an alloy of Pd with a reduction product $(MoO_{3-y}, 0<y \leq 3)$ of the molybdenum oxide. The amount of the carbonaceous support was about 40 parts by weight based on 100 parts by weight of a total weight of the catalyst.

EXAMPLE 5

Preparation of Catalyst

Tin chloride $(SnCl_2)$ (0.5 g) as a Sn precursor and 1 g of KB as a carbonaceous material were dispersed in 100 g of distilled water to prepare a mixed solution.

The mixed solution was dried by distillation at about 60° C. under a reduced pressure, and heated at about 200° C. in the air to prepare a tin oxide-carbon composite material in the form of nanoparticulates.

Afterward, 1.24 g of palladium nitrate $(Pd(NO_3)_2 \cdot 2H_2O)$ as a Pd precursor was dissolved in distilled water to prepare a mixed solution. Tin oxide-carbon composite material (0.5 g) was added to 60 g of this mixed solution and agitated. The mixed solution was dried by distillation at about 60° C. under a reduced pressure. Subsequently, the dried product was thermally treated at about 500° C. in a hydrogen atmosphere, thereby preparing a catalyst including active particles supported on the carbonaceous support, wherein the active particles had a core of tin oxide $(SnO_2)$ and a shell of an alloy of Pd with a reduction product $(SnO_{2-y}, 0<y \leq 2)$ of the tin oxide. The amount of the carbonaceous support was about 40 parts by weight based on 100 parts by weight of a total weight of the catalyst.

EXAMPLE 6

Preparation of Catalyst

Palladium nitrate $(Pd(NO_3)_2 \cdot 2H_2O)$ (1.24 g) as a Pd precursor was dissolved in distilled water to prepare a mixed solution. 0.5 g of the cerium oxide-carbon composite material of Example 2 was added to 60 g of this mixed solution and agitated.

The mixed solution was dried by distillation at about 60° C. under a reduced pressure. Subsequently, the dried product was thermally treated at about 500° C. in a hydrogen atmosphere, thereby preparing a catalyst including active particles supported on the carbonaceous support, wherein the active particles had a core of cerium oxide $(CeO_2)$ and a shell of an alloy of Pd with a reduction product $(CeO_{2-y}, 0<y \leq 2)$ of the cerium oxide. The amount of the carbonaceous support was about 40 parts by weight based on 100 parts by weight of a total weight of the catalyst.

EXAMPLE 7

Preparation of Catalyst

Palladium nitrate $(Pd(NO_3)_2 \cdot 2H_2O)$ (1.24 g) as a Pd precursor was dissolved in distilled water to prepare a mixed solution. 0.5 g of the titanium oxide-carbon composite material of Example 1 was added to 60 g of this mixed solution and agitated. The mixed solution was dried by distillation at about 60° C. under a reduced pressure.

Subsequently, the dried product was thermally treated at about 500° C. in a hydrogen atmosphere, thereby preparing a catalyst including active particles supported on the carbonaceous support, wherein the active particles had a core of titanium oxide $(TiO_2)$ and a shell of an alloy of Pd with a reduction product $(TiO_{2-y}, 0<y \leq 2)$ of the titanium oxide. The amount of the carbonaceous support was about 40 parts by weight based on 100 parts by weight of a total weight of the catalyst.

EXAMPLE 8

Preparation of Catalyst

Ammonium metatungstate $((NH_4)_6H_2W_{12}O_{40})$ (0.33 g) as a W precursor and 1 g of KB as a carbonaceous material were dispersed in 100 g of distilled water to prepare a mixed solution.

The mixed solution was dried by, distillation at about 60° C. under a reduced pressure, and heated at about 200° C. in the air to prepare a tungsten oxide-carbon composite material.

Afterward, 1.24 g of palladium nitrate $(Pd(NO_3) \cdot 2H_2O)_2$ as a Pd precursor was dissolved in distilled water to prepare a mixed solution. 0.5 g of the tungsten oxide-carbon composite material was added to 60 g of this mixed solution and agitated.

The mixed solution was dried by distillation at about 60° C. under a reduced pressure. Subsequently, the dried product was thermally treated at about 500° C. in a hydrogen atmosphere, thereby preparing a catalyst including active particles supported on the carbonaceous support, wherein the active particles had a core of tungsten oxide $(WO_2)$ and a shell of an alloy of Pd with a reduction product $(WO_{2-y}, 0<y \leq 2)$ of the tungsten oxide. The amount of the carbonaceous support was about 40 parts by weight based on 100 parts by weight of a total weight of the catalyst.

EXAMPLE 9

Preparation of Catalyst

Indium acetate $((CH_3CO_2)_3In \cdot H_2O)$ (1 g) as an In precursor and 1 g of KB as a carbonaceous material were dispersed in 100 g of distilled water to prepare a mixed solution.

The mixed solution was dried by distillation at about 60° C. under a reduced pressure, and heated at about 200° C. in the air to prepare an indium oxide-carbon composite material.

Afterward, 1.24 g of palladium nitrate $(Pd(NO3)_2 \cdot 2H2O)$ as a Pd precursor was dissolved in distilled water to prepare a mixed solution. 0.5 g of the indium oxide-carbon composite material was added to 60 g of this mixed solution and agitated. The mixed solution was dried by distillation at about 60° C. under a reduced pressure. Subsequently, the dried product was thermally treated at about 500° C. in a hydrogen atmosphere, thereby preparing a catalyst including active particles supported on the carbonaceous support, wherein the active particles had a core of indium oxide ($InO_{1.5}$) and a shell of an alloy of Pd with a reduction product ($InO_{1.5-y}$, 0<y≤1.5) of the indium oxide. The amount of the carbonaceous support was about 40 parts by weight based on 100 parts by weight of a total weight of the catalyst.

EXAMPLE 10

Preparation of Catalyst $H_2PtCl_6.6H_2O$ (0.332 g) as a Pt precursor was dissolved in distilled water to prepare a mixed solution. 0.5 g of the titanium oxide-carbon composite material of Example 1 was added to 60 g of this mixed solution and agitated.

The mixed solution was dried by distillation at about 60° C. under a reduced pressure.

Subsequently, the dried product was thermally treated at about 500° C. in a hydrogen atmosphere, thereby preparing a catalyst including active, particles supported on the carbonaceous support, wherein the active particles had a core of titanium oxide ($TiO_2$) and a shell of an alloy of Pt with a reduction product ($TiO_{2-y}$, 0<y≤2) of the titanium oxide. The amount of the carbonaceous, support was about 40 parts by weight based on 100 parts by weight of a total weight of the catalyst.

EXAMPLE 11

Preparation of Catalyst

A catalyst including active particles supported on a carbonaceous support wherein the active particles had a core of tin oxide ($SnO_2$) and a shell of an alloy of Pd with a reduction product ($SnO_{2-y}$, 0<y≤2) of the tin oxide was prepared in the same manner as in Example 5, except that the temperature of the thermal treatment in the hydrogen atmosphere was changed from about 500° C. to about 600° C. The amount of the carbonaceous support was about 40 parts by weight based on 100 parts by weight of a total weight of the catalyst.

EXAMPLE 12

Preparation of Catalyst

A catalyst including active particles supported on a carbonaceous support wherein the active particles had a core of indium oxide ($InO_{1.5}$) and a shell of an alloy of Pd with a reduction product ($InO_{1.5-y}$, 0<y≤1.5) of the indium oxide was prepared in the same manner as in Example 9, except that the temperature of the thermal treatment in the hydrogen atmosphere was changed from about 500° C. to about 600° C. The amount of the carbonaceous support was about 40 parts by weight based on 100 parts by weight of a total weight of the catalyst.

EXAMPLE 13

Preparation of Catalyst 0.384 g of $(Mn(NO_3)_2.2H_2O$ as a Mn precursor and 1 g of KB as a carbonaceous material were dispersed in 100 g of distilled water to prepare a mixed solution.

The mixed solution was dried by distillation at about 60° C. under a reduced pressure, and heated at about 200° C. in the air to prepare a manganese oxide-carbon composite material.

Afterward, 1.24 g of palladium nitrate ($Pd(NO_3)_2.2H_2O$) as a Pd precursor was dissolved in distilled water to prepare a mixed solution. The manganese oxide-carbon composite material (0.5 g) was added to 60 g of this mixed solution and agitated.

The mixed solution was dried by distillation at about 60° C. under a reduced pressure. Subsequently, the dried product was thermally treated at about 500° C. in a hydrogen atmosphere, thereby preparing a catalyst including active particles supported on the carbonaceous support, wherein the active particles had a core of manganese oxide ($MnO_2$) and a shell of an alloy of Pd with a reduction product ($MnO_{2-y}$, 0<y≤2) of the manganese oxide. The amount of the carbonaceous support was about 40 parts by weight based on 100 parts by weight of a total weight of the catalyst.

COMPARATIVE EXAMPLE 1

Preparation of Catalyst

The same catalyst preparation processes as in Example 1 where Pd and Ir were supported on the titanium oxide-carbon composite material were performed except that 0.5 g of KB as a carbonaceous material was used instead of the titanium oxide-carbon composite material, thereby preparing a $Pd_5Ir/C$ catalyst with $Pd_5Ir$ particulates dispersed on the carbonaceous material. The amount of the carbonaceous support was about 40 parts by weight based on 100 parts by weight of a total weight of the catalyst.

COMPARATIVE EXAMPLE 2

Preparation of Catalyst

Palladium nitrate ($Pd(NO_3)_2.2H_2O$) (1.24 g) as a Pd precursor was dissolved in distilled water to prepare a mixed solution. KB (0.5 g) as a carbonaceous material was added to 60 g of this mixed solution and agitated. The amount of the carbonaceous support was about 40 parts by weight based on 100 parts by weight of a total weight of the catalyst.

The mixed solution was dried by distillation at about 60° C. under a reduced pressure. Subsequently, the dried product was thermally treated at about 500° C. in a hydrogen atmosphere, thereby preparing a Pd/C catalyst with Pd particulates dispersed on the carbonaceous material.

COMPARATIVE EXAMPLE 3

Preparation of Catalyst

A catalyst was prepared in the same manner as in Example 1 except that the thermal treatment in the hydrogen atmosphere was performed at about 300° C. The amount of the carbonaceous support was about 40 parts by weight based on 100 parts by weight of a total weight of the catalyst.

COMPARATIVE EXAMPLE 4

Preparation of Catalyst

A catalyst was prepared in the same manner as in Example 6 except that the thermal treatment in the hydrogen atmosphere was performed at about 300° C. The amount of the carbonaceous support was about 40 parts by weight based on 100 parts by weight of a total weight of the catalyst.

COMPARATIVE EXAMPLE 5

Preparation of Catalyst 0.384 g of manganese nitrate ($Mn(NO_3)_2 \cdot 2H_2O$) as a Mn precursor was dissolved in distilled water to prepare a mixed solution. 0.5 g of KB as a carbonaceous material was added to 60 g of this mixed solution and agitated.

The mixed solution was dried by distillation at about 60° C. under a reduced pressure. Subsequently, the dried product was thermally treated at about 500° C. in a hydrogen atmosphere, thereby preparing a $MnO_2$/C catalyst with $MnO_2$ particulates dispersed on the carbonaceous material. The amount of the carbonaceous support was about 40 parts by weight based on 100 parts by weight of a total weight of the catalyst.

MANUFACTURE EXAMPLE 1

Manufacture of Electrode

A rotating disk electrode (RDE) was manufactured as follows.

The catalyst prepared in Example 1 and a Nafion® solution (Nafion perfluorinated ion-exchange resin, 5 wt % solution in a mixture of lower aliphatic alcohols and water, available from Aldrich) were mixed and homogenized to prepare a catalyst slurry, which was then coated on glassy carbon to form an electrode in thin film form, thereby completing the manufacture of the RDE.

MANUFACTURE EXAMPLES 2-10

Manufacture of Electrodes

Electrodes were manufactured in the same manner as in Manufacture Example 1, except that the catalysts of Examples 2-10, respectively, instead of the catalyst of Example 1, were used.

COMPARATIVE MANUFACTURE EXAMPLES 1-3

Manufacture of Electrodes

Electrodes were manufactured in the same manner as in Manufacture Example 1, except that the catalysts of Comparative Examples 1-3, respectively, instead of the catalyst of Example 1, were used.

COMPARATIVE MANUFACTURE EXAMPLE 4

Manufacture of Electrode

An electrode was manufactured in the same manner as in Manufacture Example 1, except that a 20 wt % Pt/C catalyst (available from E-Tek), instead of the catalyst of Example 1, was used.

COMPARATIVE MANUFACTURE EXAMPLE 5

Manufacture of Electrode

An electrode was manufactured in the same manner as in Manufacture Example 1, except that a 48.5 wt % Pt/C catalyst (available from TKK), instead of the catalyst of Example 1, was used.

EVALUATION EXAMPLE 1

Figure 5A:
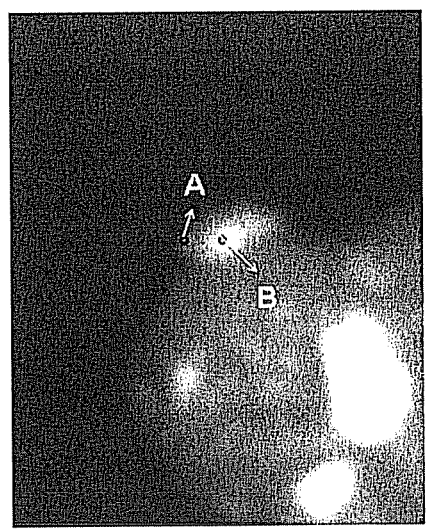
FIGS. 5A through 5C illustrate results of analysis of a catalyst of Example 6 using scanning transmission electron microscopy with energy-dispersive X-ray spectrometry (STEM-EDX)
Figure 5B:
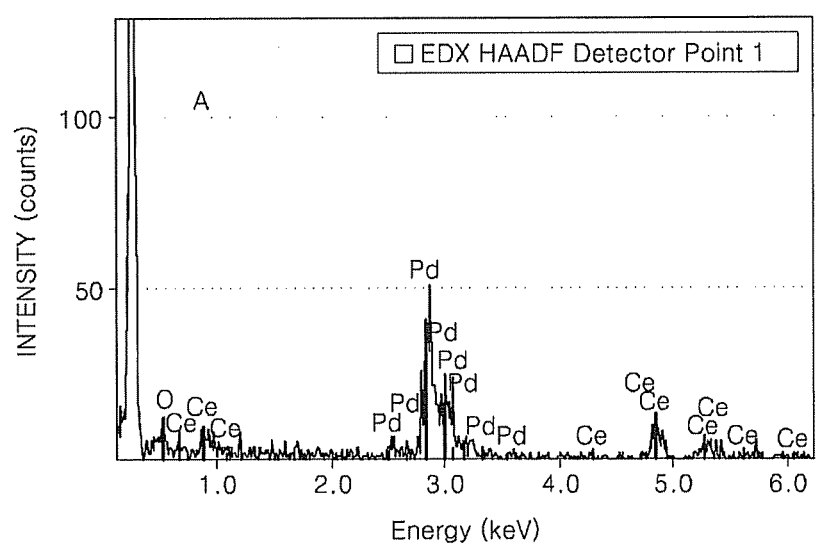
Figure 5C:
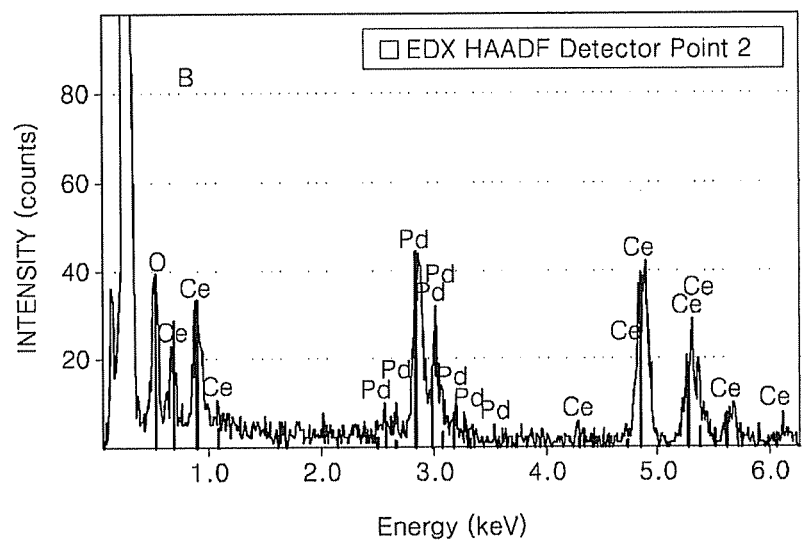
Figure 5D:
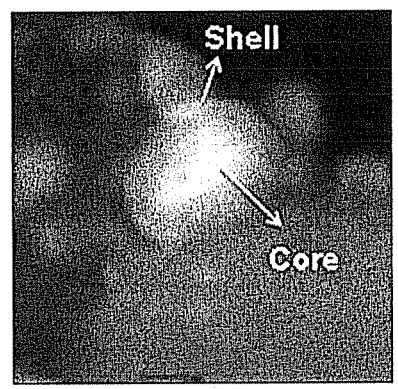
FIG. 5D is a transmission electron microscopic (TEM) image of the catalyst of Example 6.

Energy-Dispersive X-Ray Spectroscopic (EDX) and Transmission Electron Microscopic (TEM) Analysis The catalyst of Example 6 was analyzed using scanning transmission electron microscopy with energy-dispersive X-ray spectrometry (STEM-EDX). The result is shown in FIGS. 5A through 5C. FIG. 5D is a TEM image of the catalyst of Example 6. In FIG. 5A, A indicates data on a shell region of the catalyst, and B indicates data on a core-shell region of the catalyst.

Referring to FIGS. 5A through 5C, the catalyst of Example 6 is found to include cerium (Ce) both in the core and shell, but more in the core than in the shell.

FIG. 5D confirms that the catalyst has a core-shell structure.

EVALUATION EXAMPLE 2

X-Ray Diffraction (XRD) Analysis

Catalyst of Example 6

X-ray diffraction analysis was performed on the catalyst of Example 6 and the catalyst of Comparative Example 4 using an X-ray diffraction analyzer (MP-XRD, Xpert PRO, available from Philips/Power 3 kW). The results are shown in FIGS. 6A and 6B.

Figure 6A:
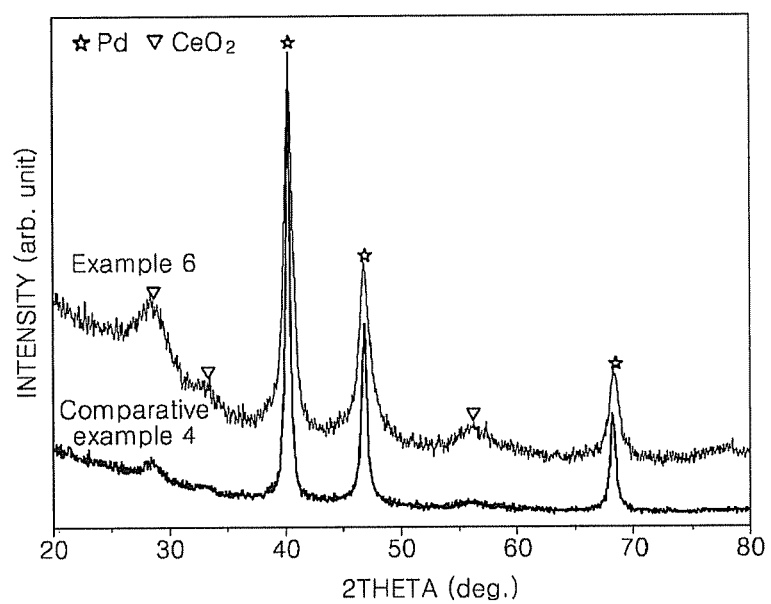
FIGS. 6A and 6B illustrate results of X-ray diffraction (XRD) analyses on the catalyst of Example 6 and a catalyst of Comparative Example R6.

Referring to FIG. 6A, both the catalysts of Examples 6 and Comparative Example 4 are found to include cerium mostly in the form of crystalline cerium oxide ($CeO_2$).

Figure 6B:
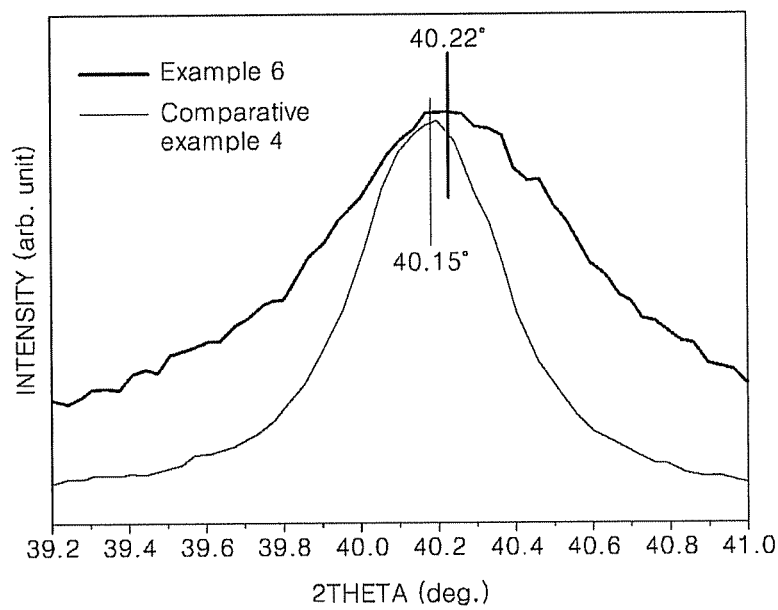

Referring to FIG. 6B, the catalyst of Comparative Example 4 after the reducing process at about 300° C. is found to have the Pd 111 peak at 40.15°, indicating the presence of pure Pd. The catalyst of Example 6 after the reducing process at about 500° C. is found to have the Pd 111 peak shifted to 40.22°, as shown in FIG. 5B. This indicates the presence of an alloy on the core surface by chemical bonds between Pd and a reduction product of cerium oxide on the core surface.

Catalysts of Examples 11-12

XRD analysis was performed on the catalysts of Examples 11 and 12 and Comparative Example 3. The results are shown in FIG. 6C.

Figure 6C:
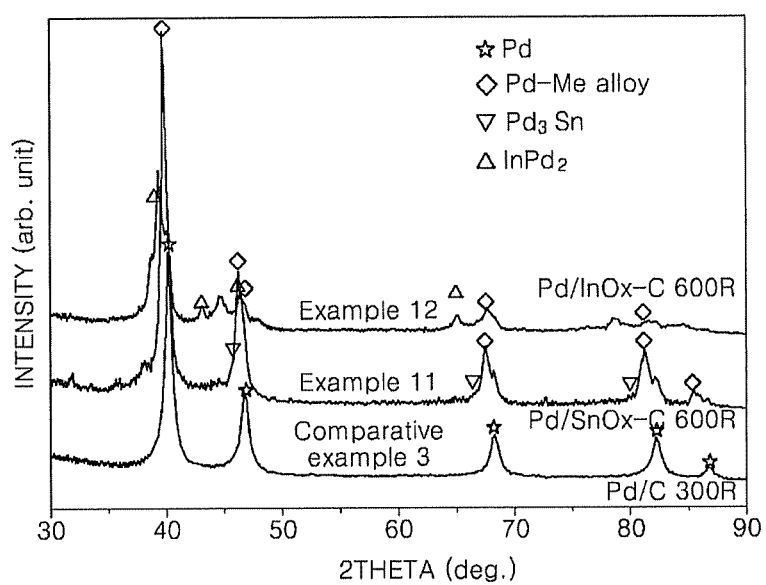
FIG. 6C illustrates results of XRD analyses on catalysts of Examples 11 and 12 and Comparative Example 3.

Referring to FIG. 6C, the catalyst of Example 11 is found to include an alloy (indicated as a Pd—Me alloy in FIG. 6C) formed by interaction between Pd and a reduction product of surficial tin oxide particles. The catalyst of Example 12 is found to include an alloy (indicated as Pd-Me alloy in FIG. 6C) formed by interaction between Pd and a reduction product of surficial indium oxide particles.

EVALUATION EXAMPLE 3

X-Ray Photoelectron Spectroscopic (XPS) Analysis

XPS analysis was performed using a non-monochromatic Al Kα X-ray at a chamber pressure of about $5 \times 10^{-10}$ mbar in a post-excitation state (after excitation using an ESCA 250 spectrometer).

1) Catalyst of Example 6

Figure 7A:
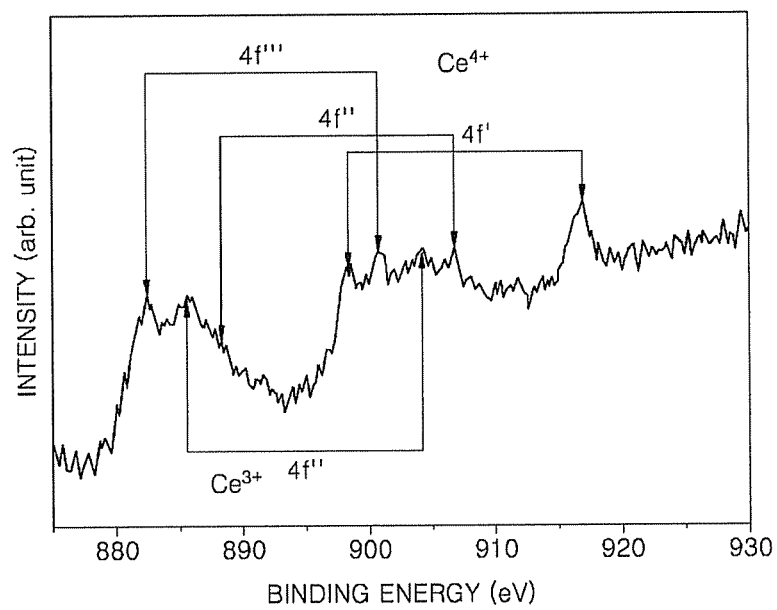
FIG. 7A illustrates a result of analysis of the catalyst of Example 6 using X-ray photoelectron spectroscopy (XPS)

The catalyst of Example 6 was analyzed for an oxidation state of the cerium oxide on the catalyst surface using X-ray photoelectron spectroscopy (XPS). The result is shown in FIG. 7A. The XPS analysis was performed with a depth adjustment to about 5 nm from the shell surface of the catalyst to identify the state of Ce over the depth range.

Referring to FIG. 7A, both a tetravalent Ce ($CeO_2$ in the core) and a reduced trivalent Ce (reduced Ce bound with Pd on the core surface) are clearly found on the core surface of the catalyst.

2) Catalysts of Example 13 and Comparative Example 5

Figure 7B:
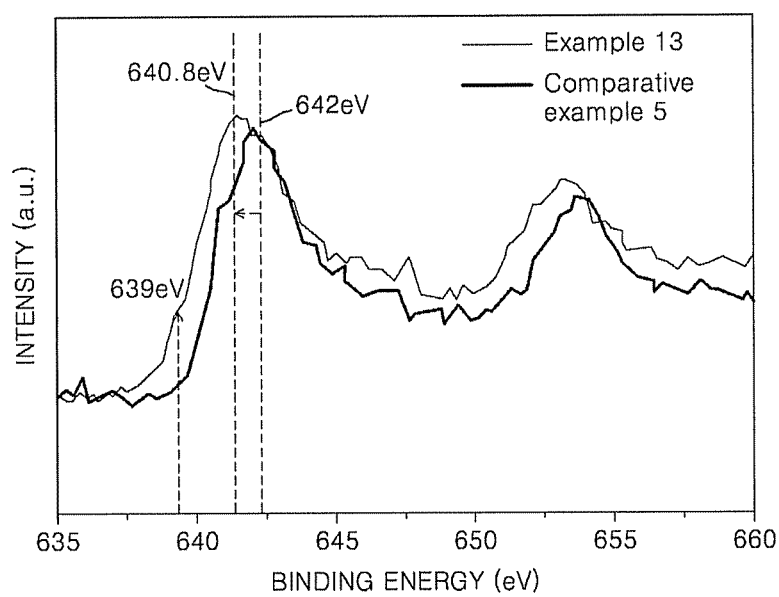
FIG. 7B illustrates results of XRD analyses on catalysts of Example 13 and Comparative Example 6.

The catalysts of Example 13 and Comparative Example 5 were analyzed for an oxidation state of the manganese oxide on the catalyst surface using XPS. The results are shown in FIG. 7B. The XPS analysis was performed with a transmission depth adjustment to about 5 nm.

FIG. 7B comparatively shows the oxidation state of Mn between the catalyst of Comparative Example 5 and the catalyst of Example 3.

The catalyst of Comparative 5 exhibits only a peak of Mn (binding energy: about 642 eV) with an oxidation number of +4, while the catalyst of Example 13 exhibits a Mn peak (binding energy: about 640.8 eV) from MnO resulting from a partial reduction of $MnO_2$, a peak of Mn in a metal state (binding energy: about 639 eV), and a peak of Mn with an oxidation number of +4 (binding energy: about 642 eV). This also indicates that the catalyst of Example 13 includes a reduced Mn oxide and metal Mn, which resulted from the thermal treatment in a hydrogen reducing atmosphere at about 500° C.

EVALUATION EXAMPLE 4

Extended X-Ray Absorption Fine Structure (EXAFS) Analysis

Figure 7C:
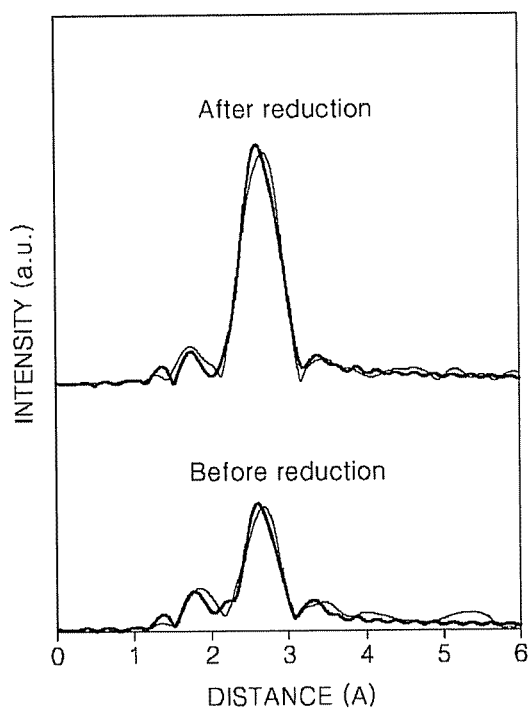
FIG. 7C illustrates a result of extended X-ray absorption fine structure (EXAFS) analysis of the catalyst of Example 13.

EXAFS analysis was performed on the catalyst of Example 13. The results are shown in FIG. 7C and Table 1 below.

TABLE 1

| Absorption edge | Sample | Pair | R (nm) | N | σ2 (pm2) |
|---|---|---|---|---|---|
| Pd K edge | $Pd/MnO_x/C$ Before reduction | Pd—O | 0.200 | 0.6 | ~0 |
| | | Pd—Pd | 0.269 | 0.9 | 20 |
| | | Pd—Mn | 0.302 | 0.8 | 43 |
| | $Pd/MnO_x/C$ After reduction | Pd—O | 0.198 | 0.5 | ~0 |
| | | Pd—Pd | 0.268 | 1.5 | 11 |
| | | Pd—Mn | 0.298 | 1.5 | 43 |

In Table 1 above, before and after reduction mean before and after the thermal treatment at about 500° C. in the hydrogen atmosphere in Example 13, respectively, R represents a bond distance, and σ2 represents a device factor.

Referring to FIG. 7C and Table 1, a Pd—Mn coordination number was increased from 0.8 before reduction to 1.5 after reduction, indicating formation of an alloy of Pd with a reduction product of manganese oxide.

EVALUATION EXAMPLE 5

ORR Activity Analysis of Half Cells

1) Half Cells Including Electrodes of Manufacture Example 1 and Comparative Manufacture Example 3

Rotating disk electrodes (RDEs) manufactured in Manufacture Example 1 and Comparative Manufacture Example 3 were used as working electrodes.

Electrochemical evaluation was performed using a three-electrode system. Each half cell was manufactured using an oxygen-saturated 0.1 M-$HClO_4$ solution as an electrolyte, and a Pt foil and a Ag/AgCl electrode, respectively, as a counter electrode and a reference electrode. All the electrochemical experiments were performed at room temperature.

In a 0.1M $HClO_4$ electrolyte solution saturated with oxygen, while rotating the RDE of each of the three-electrode cells at 900 rpm with voltage changes at a scan rate of 5 mV/s, current density values were measured at a voltage range from an onset potential (OCV) to about 0.9V as ORR activities at room temperature. The results are shown in FIG. 8

An onset potential refers to a voltage level at which current starts to flow due to an ORR. Catalyst activity is determined from a difference between ORR current values at the onset potential and a potential nearest to the onset potential.

Figure 8:
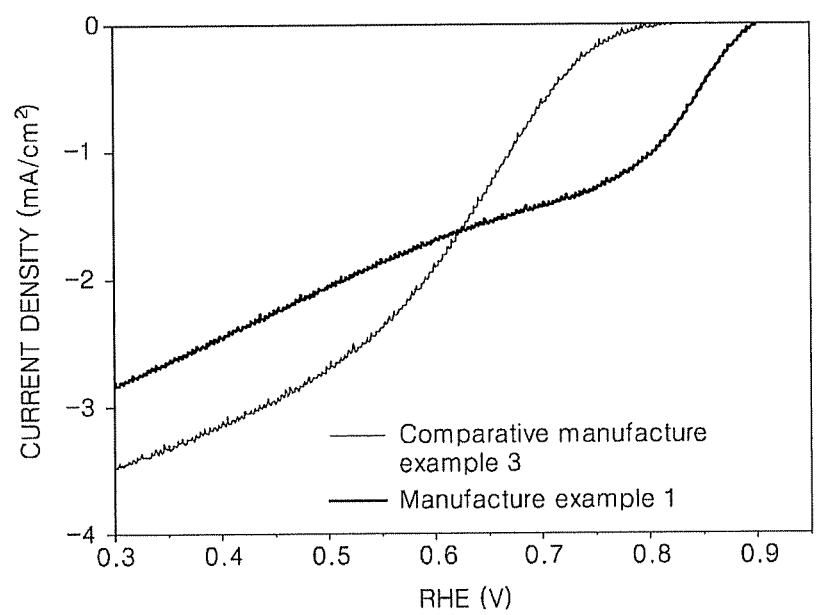
FIG. 8 illustrates result of oxygen reduction reaction (ORR) activity measurements of half cells including electrodes manufactured according to Manufacture Example 1 and Comparative Manufacture Example 3, which were conducted at room temperature in a 1M $HClO_4$ solution saturated with oxygen.

In FIG. 8, RHE is an abbreviation for reversible hydrogen electrode.

Referring to FIG. 8, the half cell of Manufacture Example 1 was found to have improved ORR activities compared with the half cell of Comparative Manufacture Example 3.

2) Half Cells Including Electrodes of Manufacture Example 2, Comparative Manufacture Example 1, and Comparative Manufacture Example 4

The ORR activities of the half cells according to Manufacture Example 2, and Comparative Manufacture Examples 1 and 4 were measured at room temperature in a 0.1M $HClO_4$ solution saturated with oxygen. The results are shown in FIG. 9.

Figure 9:
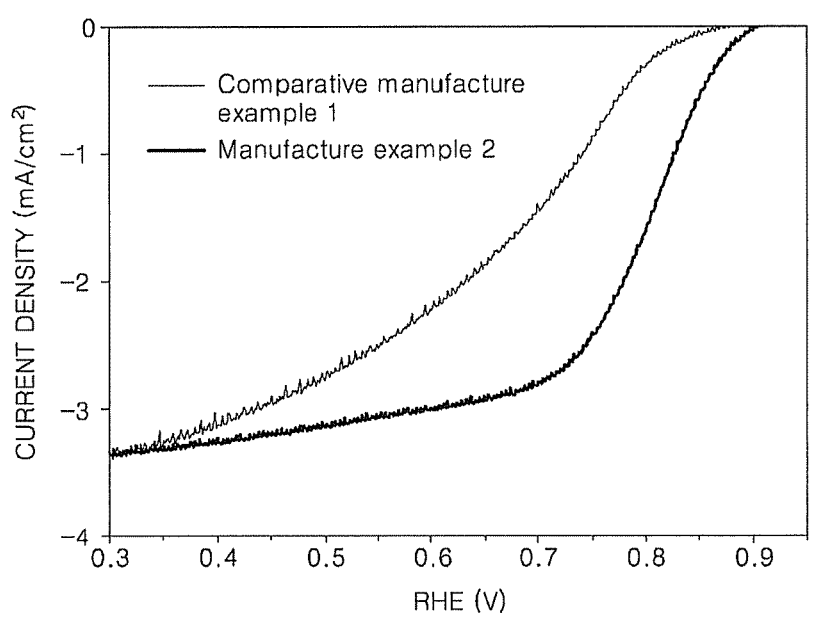
FIG. 9 illustrates results of ORR activity measurements of half cells including electrodes manufactured according to Manufacture Example 2 and Comparative Manufacture Example 1, which were conducted at room temperature in a 1M $HClO_4$ solution saturated with oxygen.

Referring to FIG. 9, the half cell according to Manufacture Example 2 has improved ORR activities than the fuel cells according to Comparative Manufacture Examples 1 and 4.

3) Half Cells Including Electrodes of Manufacture Examples 3-6, and Comparative Manufacture Example 2

The ORR activities of the half cells according to Manufacture Examples 3-6 and Comparative Manufacture Example 2 were measured at room temperature in a 0.1M $HClO_4$ solution saturated with oxygen. The results are shown in FIG. 10.

Figure 10:
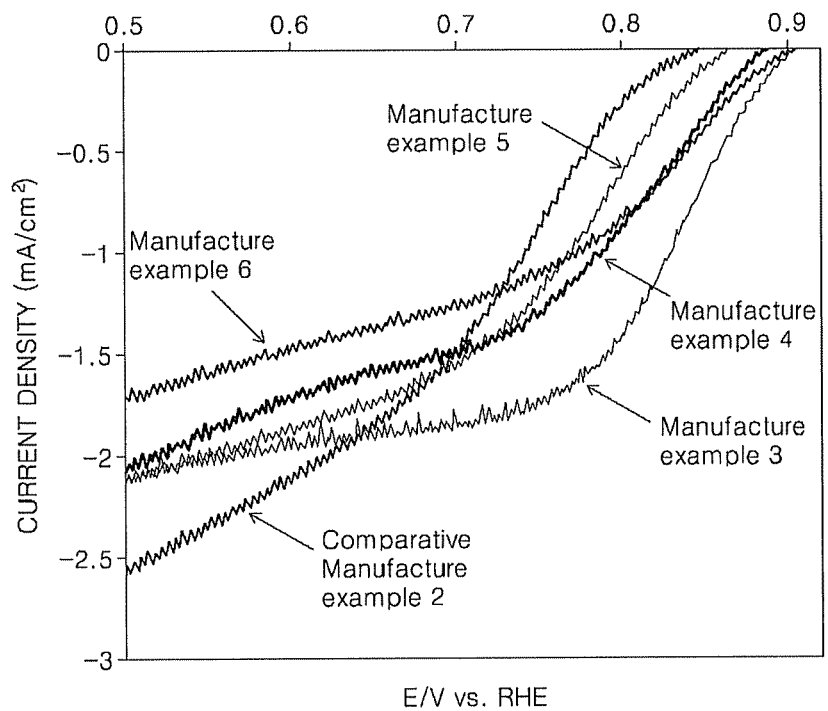
FIG. 10 illustrates results of ORR activity measurements of half cells including electrodes manufactured according to Manufacture Examples 3-6 and Comparative Manufacture Example 2, which were conducted at room temperature in a 1M $HClO_4$ solution saturated with oxygen.

Referring to FIG. 10, the half cells according to Manufacture Examples 3-6 have improved ORR activities than the half cell according to Comparative Manufacture Example 2.

4) Half Cells Including Electrodes of Manufacture Examples 7-9 and Comparative Manufacture Example 2

The ORR activities of the half cells according to Manufacture Examples 7-9 and Comparative Manufacture Example 2 were measured at room temperature in a 0.1M $HClO_4$ solution saturated with oxygen. The results are shown in FIG. 11.

Figure 11:
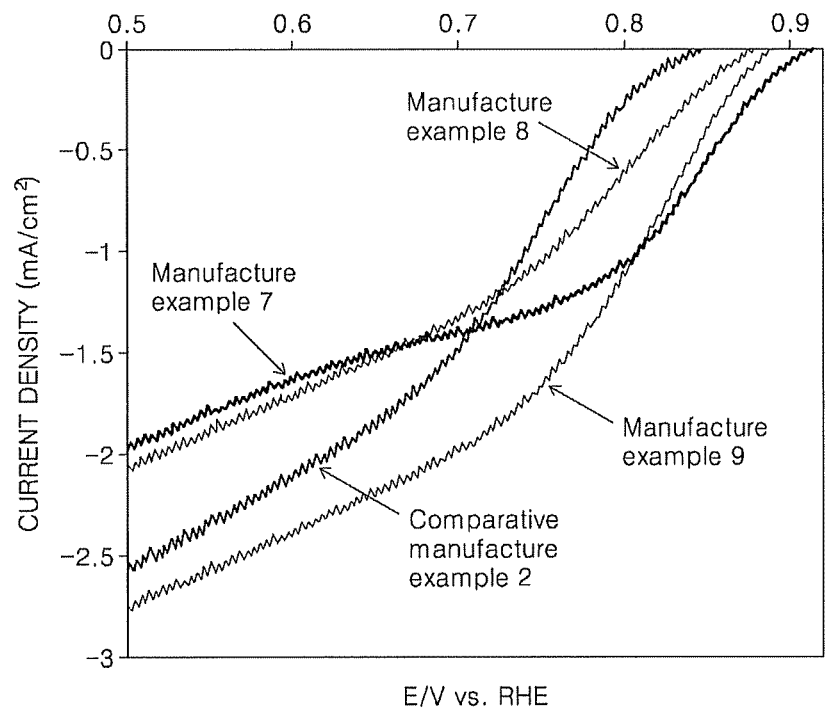
FIG. 11 illustrates results of ORR activity measurements of half cells including electrodes manufactured according to Manufacture Examples 7-9 and Comparative Manufacture Example 2, which were conducted at room temperature in a 1M $HClO_4$ solution saturated with oxygen.

Referring to FIG. 11, the half cells according to Manufacture Examples 7-9 have improved ORR activities than the half cell according to Comparative Manufacture Example 2.

5) Half Cells Including Electrodes of Manufacture Example 10 and Comparative Manufacture Examples 4-5

The ORR activities of the half cells according to Manufacture Example 10 and Comparative Manufacture Examples 4-5 were measured at room temperature in a 0.1M $HClO_4$ solution saturated with oxygen. The results are shown in FIG. 12.

Figure 12:
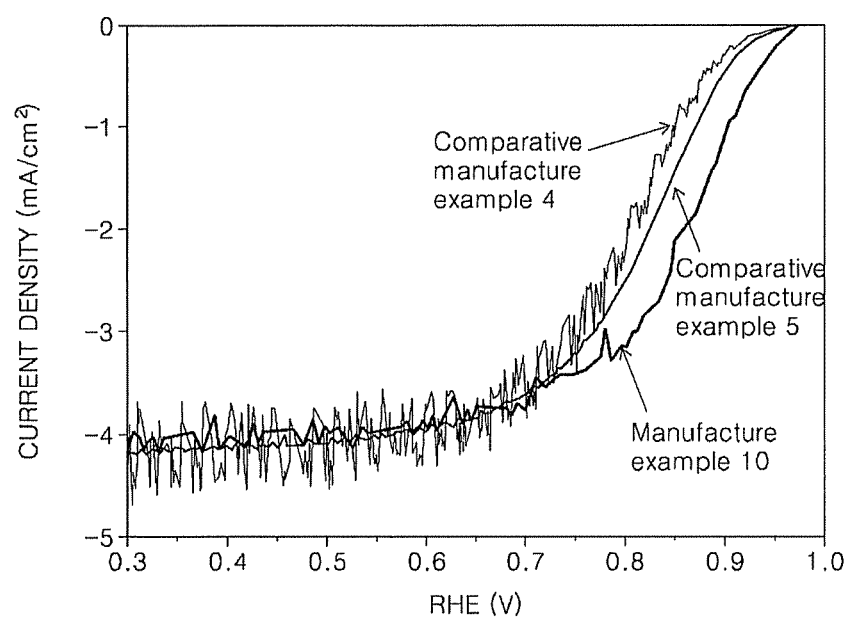
FIG. 12 is a graph showing ORR activities at room temperature of half cells including electrodes manufactured according to Manufacture Example 10 and Comparative Manufacture Examples 4-5.

Referring to FIG. 12, the half cell according to Manufacture Example 10 has better ORR activities than the half cells according to Comparative Manufacture Examples 4-5.

The ORR activities in FIGS. 9-12 were measured using the same method as described in connection with FIG. 6.

EVALUATION EXAMPLE 6

Evaluation of Unit Cell Performance

Fuel cells were manufactured using the catalysts of Example 1 and Comparative Example 1 as follows.

To manufacture an anode of a PEMFC, 0.03 g of polyvinylidene fluoride (PVDF) and an adequate amount of N-methyl-2-pyrrolidone (NMP) solvent were mixed per 1 g of Pd—Ir, to prepare an anode-forming slurry. The anode slurry was coated on a microporous layer-coated carbon paper using a bar coater, and the resultant article was dried while the temperature was stepwise increased from room temperature to 150° C., thereby producing an anode. The amount of the catalyst loaded in the anode was 1 mg/cm$^2$.

A cathode was manufactured using the catalyst of Example 1 in the same manner as in the manufacture of the anode described above. The amount of the catalyst loaded in the cathode was about 1.5 mg/cm$^2$.

A PEMFC was manufactured by disposing poly(2,5-benzimidazole) doped with 85 wt % phosphoric acid as an electrolyte membrane between the anode and the cathode.

A fuel cell manufactured using the catalyst of Comparative Example 1 was manufactured in the same manner as in the fuel cell manufactured using the catalyst of Example 1 except that the catalyst of Comparative Example 1 was used for forming the cathode.

Cell voltages with respect to current density were measured using the fuel cells including the catalysts of Example 1 and Comparative Example 1. The results are shown in FIG. 13.

Figure 13:
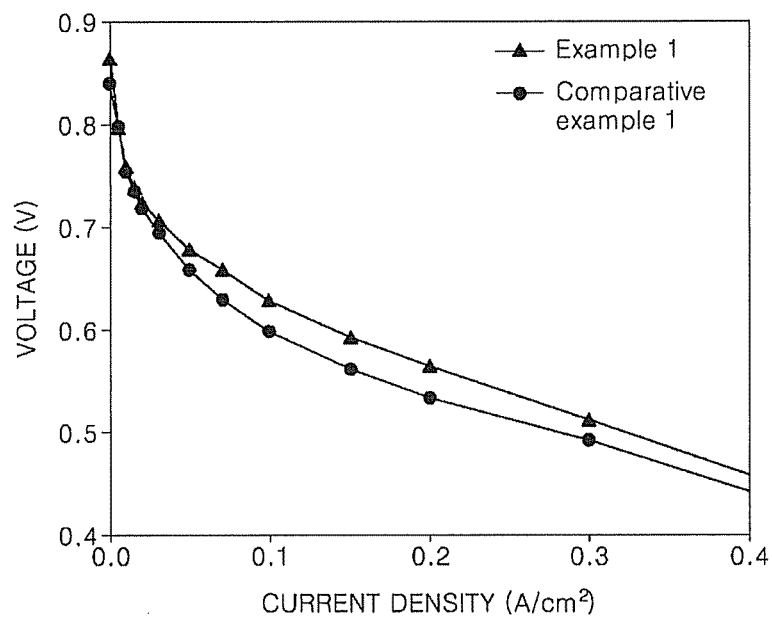
FIG. 13 is a graph of cell voltages with respect to current density of fuel cells including catalysts manufactured according to Example 1 and Comparative Example 1.

Referring to FIG. 13, the fuel cell using the catalyst of Example 1 is found to have improved cell performed as compared with the fuel cell using the catalyst of Comparative Example 1.

As described above, according to the one or more of the above embodiments of the present disclosure, the disclosed catalysts have enhanced oxygen-reduction activity. Therefore, using the catalyst, a fuel cell with higher ORR activities can be manufactured.

It should be understood that the exemplary embodiments described therein should be considered in a descriptive sense only and not for purposes of limitation. Descriptions of features or aspects within each embodiment should typically be considered as available for other similar features or aspects in other embodiments.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A catalyst comprising:
   active particles that have a core-shell structure;
   a core particle of the core-shell structure comprises a first metal oxide; and
   a shell of the core-shell structure comprises an alloy of a second metal with a reduction product of the first metal oxide.

2. The catalyst of claim 1, wherein the active particles further comprise a layer including a second metal on the shell.

3. The catalyst of claim 1, wherein the first metal comprises at least one selected from among metals of Groups 3-8, Groups 10-14, and Group 16 of the periodic table of elements.

4. The catalyst of claim 1, wherein the second metal comprises at least one selected from among metals of Groups 8-11.

5. The catalyst of claim 1, wherein the first metal comprises at least one selected from the group consisting of titanium (Ti), zirconium (Zr), vanadium (V), niobium (Nb), tantalum (Ta), molybdenum (Mo), tungsten (W), manganese (Mn), tin (Sn), indium (In), cerium (Ce), lanthanum (La), chromium (Cr), zinc (Zn), iron (Fe), cobalt (Co), nickel (Ni), copper (Cu), tellurium (Te), and yttrium (Y).

6. The catalyst of claim 1, wherein the second metal comprises at least one selected from the group consisting of platinum (Pt), palladium (Pd), ruthenium (Ru), iridium (Ir), gold (Au), and silver (Ag).

7. The catalyst of claim 1, wherein the second metal of alloy thereof is a Pt alloy, a Pd alloy, or a Pd-Ir alloy.

8. The catalyst of claim 1, wherein the first metal is titanium (Ti), and the second metal is platinum (Pt).

9. The catalyst of claim 1, wherein the first metal is titanium (Ti) or cerium (Ce), and the second metal is a Pd-Ir alloy.

10. The catalyst of claim 1, wherein the first metal is titanium (Ti), cerium (Ce), tantalum (Ta), molybdenum (Mo), tin (Sn), tungsten (W), indium (In), or manganese (Mn); and the second metal is palladium (Pd).

11. The catalyst of claim 1, wherein the catalyst comprises:
   active particles with a core particle including titanium oxide ($TiO_2$), and a shell including an alloy of $Pd_5Ir$ with a reduction product ($TiO_{2-y}$, $0<y\le2$) of the titanium oxide;
   active particles with a core particle including cerium oxide ($CeO_2$), and a shell including an alloy of $Pd_5Ir$ with a reduction product ($CeO_{2-y}$, $0<y\le2$) of the cerium oxide;
   active particles with a core particle including tantalum oxide ($TaO_{2.5}$), and a shell including an alloy of Pd with a reduction product ($TaO_{2.5-y}$, $0<y\le2.5$) of the tantalum oxide;
   active particles with a core particle including molybdenum oxide ($MoO_3$), and a shell including an alloy of Pd with a reduction product ($MoO_{3-y}$, $0<y\le3$) of the molybdenum oxide;
   active particles with a core particle including tin oxide ($SnO_2$), and a shell including an alloy of Pd with a reduction product ($SnO_{2-y}$, $0<y\le2$) of the tin oxide;
   active particles with a core particle including cerium oxide ($CeO_2$), and a shell including an alloy of Pd with a reduction product ($CeO_{2-y}$, $0<y\le2$) of the cerium oxide;
   active particles with a core particle including titanium oxide ($TiO_2$), and a shell including an alloy of Pd with a reduction product ($TiO_{2-y}$, $0<y\le2$) of the titanium oxide;
   active particles with a core particle including tungsten oxide ($WO_2$), and a shell including an alloy of Pd with a reduction product ($WO_{2-y}$, $0<y\le2$) of the tungsten oxide;
   active particles with a core particle including indium oxide ($InO_{1.5}$), and a shell including an alloy of Pd with a reduction product ($InO_{1.5-y}$, $0<y\le1.5$) of the indium oxide;
   active particles with a core particle including titanium oxide ($TiO_2$), and a shell including an alloy of Pt with a reduction product ($TiO_{2-y}$, $0<y\le2$) of the titanium oxide; or
   active particles with a core particle including manganese oxide ($MnO_2$), and a shell including an alloy of Pd with a reduction product ($MnO_{2-y}$, $0<y\le2$) of the manganese oxide.

12. The catalyst of claim 1, further comprising a carbonaceous support on which the active particles are supported.

13. A fuel cell comprising a cathode, an anode, and an electrolyte membrane disposed between the cathode and the anode, wherein at least one of the cathode and anode comprises the catalyst of claim 1.

14. A method of preparing the catalyst of claim 1, the method comprising:
   mixing a first metal oxide and a second metal precursor or second metal particles together to obtain a mixture; and performing thermal treatment to induce reduction of the mixture at about 400° C. or higher.

15. The method of claim 14, wherein the first metal oxide is prepared by:
mixing a first metal precursor and a solvent together to obtain a mixture; and drying the mixture and performing thermal treatment to induce oxidation of the mixture.

16. The method of claim 15, further comprising adding a carbonaceous support when mixing the first metal precursor and the solvent together.

17. The method of claim 15, wherein the thermal treatment to induce oxidation is performed at a temperature lower than about 300° C.

18. The method of claim 14, wherein the mixing of the first metal oxide and the second metal precursor or second metal particles together is performed in the presence of a reducing agent so that the second metal precursor or second metal particles are dispersed in the first metal oxide.

19. The method of claim 14, wherein the thermal treatment to induce reduction is performed at a temperature of from about 400° C. to about 900° C.

20. An electrode for a lithium air battery, the electrode comprising active particles with a core that includes a first metal oxide, and a shell that includes an alloy of a second metal with a reduction product of the first metal oxide.

21. The electrode for a lithium air battery of claim 20, further comprising a carbonaceous support.

22. A lithium air battery comprising the electrode of claim 20.

* * * * *